Feb. 1, 1966   H. B. SAPP, JR., ET AL   3,232,196
AUTOMATIC FILM WINDING ARRANGEMENT
Filed Feb. 11, 1963   2 Sheets-Sheet 1
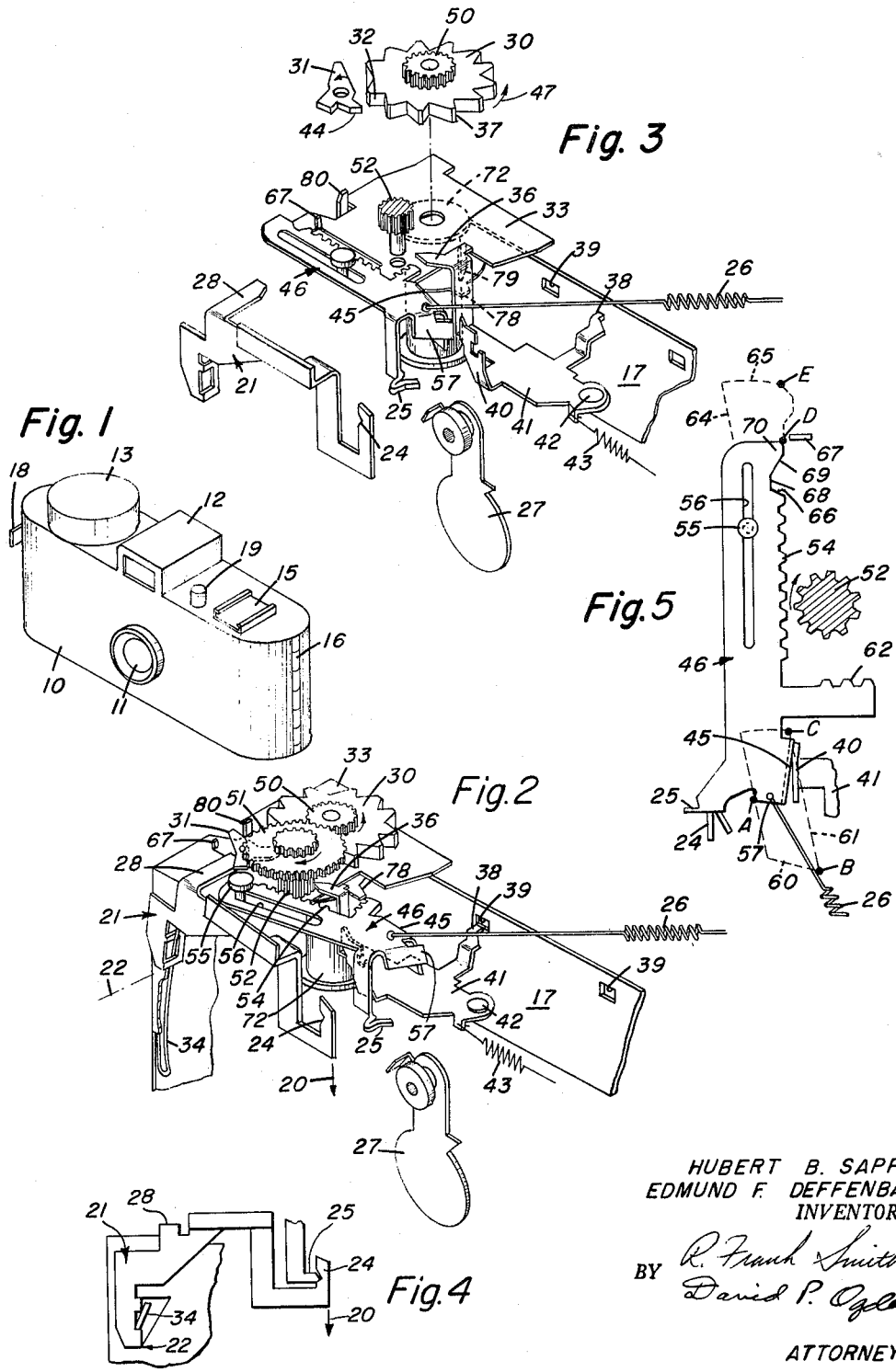
HUBERT B. SAPP, JR.
EDMUND F. DEFFENBAUGH
INVENTORS
BY R. Frank Smith
David P. Ogden
ATTORNEYS

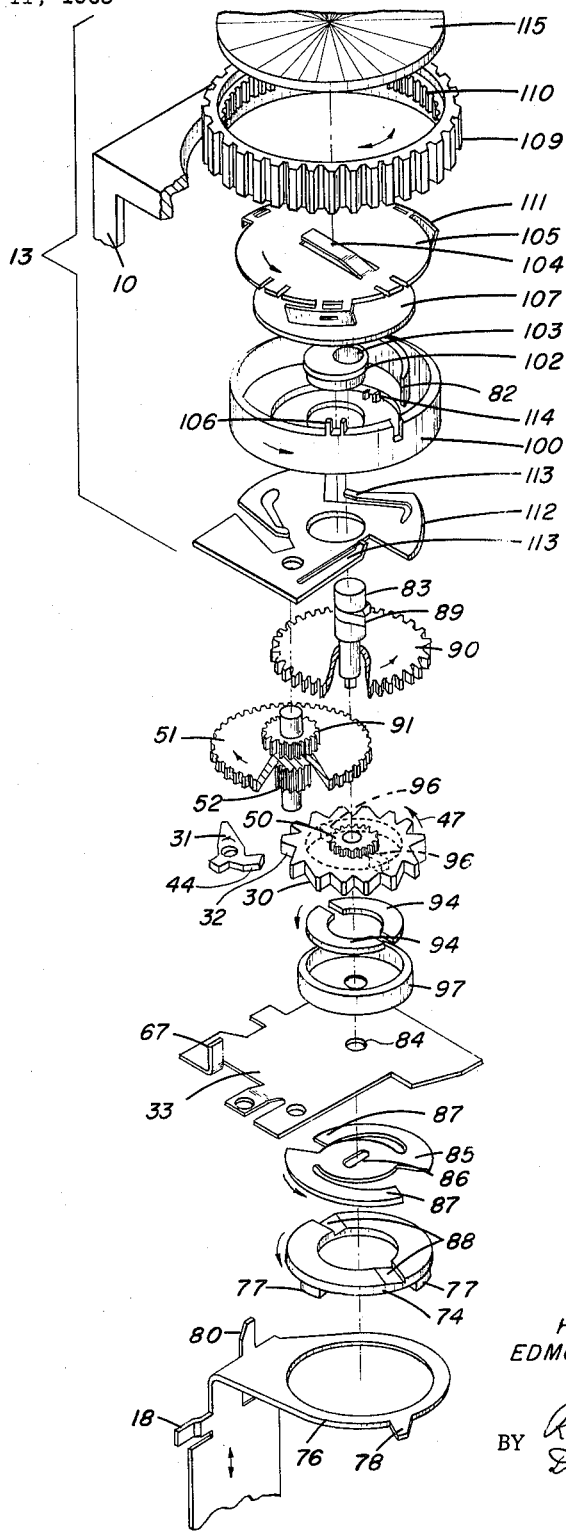

United States Patent Office 3,232,196
Patented Feb. 1, 1966

3,232,196
AUTOMATIC FILM WINDING ARRANGEMENT
Hubert B. Sapp, Jr., and Edmund F. Deffenbaugh, Rochester, N.Y., assignors to Eastman Kodak Company, Rochester, N.Y., a corporation of New Jersey
Filed Feb. 11, 1963, Ser. No. 257,514
20 Claims. (Cl. 95—31)

This invention relates to an automatic film winding arrangement and, more particularly, to a camera construction incorporating an automatic film winding arrangement to allow rapid sequential operation of a "still" camera.

Several attempts have been made to develop simple and reliable powered film drive mechanisms suitable for use by the amateur photographer. Some of the arrangements suggested in the prior art are unacceptable because of their being nonreliable in one of several areas, including the probability of skipping an exposure frame because of inadequate latch or signal means coupling the film to the drive mechanism; another being the ability of the shutter to operate whether or not the film has been advanced a proper amount. Additionally, such arrangements tend to be both technically and mechanically complex and utilize such a number of parts that maintenance problems become a serious handicap.

Therefore, a primary object of the present invention is to provide an automatic film winding arrangement suitable for amateur photographer use.

A further object is to provide a new and novel film position and shutter trigger interlock arrangement.

Another object is to provide a new and novel film speed control arrangement.

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawings in which:

FIG. 1 is a perspective schematic view of a camera adapted to utilize the present invention;

FIG. 2 is a partial perspective view of the present invention;

FIG. 3 is an exploded view of the elements illustrated in FIG. 1;

FIG. 4 is an elevational view of a portion of the elements illustrated in FIGS. 2 and 3;

FIG. 5 is a detail plan view of a portion of the elements illustrated in FIGS. 2 and 3; and FIG. 6 is an exploded view including several of the elements illustrated in FIGS. 2 and 3 and other elements of the present invention.

Referring now to the drawings wherein like numbers designate similar parts, we have shown in FIG. 1 a camera housing 10 having associated therewith a lens 11, a viewfinder 12, and a winding knob 13. In order to prevent damage of the winding knob 13, the rearmost portion thereof is forward of the rearmost portion of the camera housing 10. The camera is also provided with a flash attachment arrangement as is indicated by a support 15. The rear portion of the camera may be opened to expose the film replacement area being hinged at 16 and is latched at the opposite end of the camera. The rear portion is unlatchable by upward motion of a latch tab 18. Triggering of the shutter is accomplished by depressing a button 19 positioned on the upper surface of the camera housing 10. The overall operation of the present invention involves only winding the knob 13, sighting suitable subjects through the viewfinder 12, and depressing the button 19. If a usual flash is required, the operator will replace flash bulbs between shots. However, further winding of a film drive arrangement is not required.

As may be expected, the simplifying of camera operation requires many interdependent operations in connection with the knob 13 and the button 19.

Referring now to FIGS. 2 and 3, the operations resulting from winding the knob 13 and depressing the trigger button 19 (FIG. 1) include a downward motion as indicated by the arrow 20 of a trigger arrangement 21 in direct response to depression of the button 19. This downward motion 20 pivots the trigger arrangement and moves it from a stand-by position (illustrated in FIGS. 4 and 5) about an axis indicated at 22 so that a trigger trip 24 releases a foot 25 which responds to the bias developed by a rack spring 26 and moves from its stand-by position to engage a shutter mechanism 27 in a usual manner. Operation of the shutter 27 allows light to strike and form an image on a selected portion of a strip of film 17. The alignment of the trigger trip 24 and the axis 22 of the trigger arrangement 21 is selected to be such that the rack spring 26 does not tend to rotate the trigger. This alignment is more clearly illustrated in FIGS. 3, 4, and 5 wherein the trigger arrangement 21 is horizontally disposed and the tigger trip 24 resides against it.

After depression of the trigger button 19, and so long as the trigger arrangement 21 remains in the depressed position, further operation of the present invention is prevented by an interlock means shown as a lug 28 which operates to prevent rotation of a ratchet tooth gear 30 by means of a back-up pawl 31 engaging a tooth 32 of the ratchet tooth gear. In other words, depression of the trigger arrangement forces the back-up pawl 31 into tight engagement with the ratchet tooth 32 of the ratchet tooth gear 30 and prevents further motion of the parts coupled thereto. The several gears and the pawl 31 are rotatably supported on a gear plate 33.

In operating a camera of this type, a driving motor of some type such as a spring drive motor is connected to the ratchet tooth gear 30 by means of gearing tending to drive the ratchet tooth gear. Rotation of the trigger arrangement 21 is a first step in a series of interdependent reactions for automatically moving the film 17. Release of the trigger button 19 allows the trigger arrangement 21 to return to its normal or stand-by position in response to bias developed by a spring 34, whereupon the back-up pawl 31 is released and the ratchet tooth gear 30 is freed to rotate.

However, a second or meteirng pawl 36 is also arranged under preselected conditions to engage a second ratchet tooth 37 in an interlock manner and to prevent rotation of the ratchet tooth gear 30, as will now be explained. The metering pawl 36 is coupled directly to a sensing pawl 38 which senses and engages indicator means such as apertures 39 in the film strip 17. While the sensing pawl 38 is residing in one of these apertures 39, the metering pawl 36 is positioned to prevent rotation of the ratchet tooth gear 30. Also coupled to the pawls 36 and 38 is an arm or island 40, with all three elements being a portion of a metering lever 41 pivotable about a support pin 42. A relatively soft lever spring 43 is provided to rotate the metering lever 41 and pull the sensing pawl 38 from the apertures 39 and release the ratchet tooth gear 30. The utilization of the soft spring 43 is made feasible by the fact the back-up pawl 31 is arranged to drive the ratchet tooth gear 30 a few degrees in the reverse direction to relieve any pressure from the metering pawl 36. This action is illustrated in FIG. 2 wherein rotation of the trigger arrangement 21 has driven the lug 28 to the left in the camera to rotate the back-up pawl 31 counterclockwise. In this position a back-up pawl tip 44 thereof engages the gear tooth 32 (FIGS. 3 and 5) to drive the ratchet tooth gear 30 clockwise a short distance. This operation is opposed to the normal counterclockwise rotation of the ratchet tooth gear 30 as indicated by an arrow 47.

Also, the use of the soft spring 43 results in the rack spring 26 overriding the bias thereof so that a rack 46 in stand-by position (FIGS. 4 and 5) couples the rack spring 26 to bias the sensing pawl 38 against the film strip 17. As is illustrated in the drawings, the standby position of the rack 46 (in the sense of biasing the arm 40) is defined to include a range of positions in which some portion of a lug 45 is directly in front of the arm 40. This feature of the present invention will be better understood after reading the discussion below directed to FIG. 5.

Initially, a lug 45 of the rack 46 supporting the trigger foot 25 is moved past the arm 40 of the metering lever 41. Since the rack 46 usually moves quite rapidly to the left in the camera in response to the rack spring 26, the arm 40 is freed and the metering lever 41 rotates in response to the soft spring 43 to remove the interlock between the ratchet tooth 37 and the metering pawl 36 before the trigger button 19 (FIG. 1) can be released. Thus, upon release of the trigger button 19, the ratchet tooth wheel 30 is free to rotate as is gear 50 secured to the top thereof, a gear 51 drivingly coupled thereto, and a pinion 52. The pinion 52 drivingly engages rack teeth 54 to withdraw the rack 46 against the tension developed by the spring 26. During both left and right motion of the rack 46, it is guided by a pin 55 in a slot 56. However, during return motion of the rack 46, the lug 45 no longer engages the surface of the arm 40 of the metering lever 41 to force the sensing pawl 38 toward the film 17. During this portion of the stroke, the forward portion of the rack including a second lug 57 now passes behind the arm 40 to assure a desired travel path of the rack 46 in relation to the pin 55 and the pinion 52. This travel path is selected so that there is maintained a driving connection between the pinion 52 and the rack teeth 54.

Referring now to FIG. 5, the leftward path or stroke of a corner A of the rack 46 is illustrated by the dashed line 60. The return stroke is shown at 61. The rack 46 (shown in solid lines) is illustrated with the foot 25 being retained by the trigger trip 24. When the trigger arrangement 21 is depressed, the trigger trip 24 releases the foot 25 so that the corner A moves in response to the tension in the spring 26. The initial motion is guided by the arm 40 of the metering lever 41 pressing against the lug 45 of the rack 46. At such time as the lug 45 moves past the end of the arm 40, the corner A moves to the rear, as illustrated, stopping at position B because of the pin 55 engaging the rear end of the slot 56. When the rack 46 moves to the position freeing the arm 40, the metering lever 41 rotates in response to the soft spring 43 so that the ratchet tooth gear 30 is free to rotate when the back-up pawl 31 is released. This motion of the metering lever 41 also withdraws the sensing pawl 38 from the film strip 17.

When the trigger arrangement 21 is released, pressure developed by the lug 28 on the back-up pawl 31 is also relieved, whereby the ratchet tooth gear 30 becomes rotatable in response to a spring drive motor (FIG. 6) so that the pinion 52 rotates to retract the rack 46 under the guidance of the pin 55, the slot 56 and the spring 26. The relative spacing of the pin 55, the pinion 52, and the tension developed by the spring 26 is such that the lugs 45 and 57 pass behind the arm 40, as indicated by continuation of the dashed line 61 to the right in the camera from position B. When the corner A reaches position C, the pinion 52 engages drive means shown as teeth 62 to drive that end of the rack 46 toward the front of the camera housing 10. The lug 57 engages the arm 40 during this portion of the cycle to maintain a driving coupling between the pinion 52 and the rack teeth 62 during the forward movement thereof.

Once the lug 57 has cleared the surface of the arm 40, the rack 46 is partially freed to move toward the trigger trip 24 in response to the tension of the rack spring 26. However, the position of the slot 56 relative to the pin 55 and the pinion 52 is such that the teeth 54 do not tightly engage the pinion 52 whereby the gearing may continue to rotate. Moreover, the arm 40 is prevented from moving toward the film 17 by the engagement between the film 17 and the sensing pawl 38 (as indicated in FIG. 3). The rack 46 remains in such condition until the sensing pawl 38 finds an aperture 39 so that it can move into it. Once the rack 46 is freed by the arm 40 and since the trigger arrangement 21 has been released previously, the foot 25 advances to the trigger trip 24 and a complete cycle of operation of the forward portion of the rack 46 is described. It should be noted that the rack 46 is, in fact, performing additional functions.

A rear corner D of the rack 46 also follows a unique path during the motion of the forward portion of the rack, as discussed in connection with corner A above. During the rearward travel of the rack 46, the corner D follows a relatively straightline path, as indicated at 64, until the pinion 52 engages the rack teeth 62. When the pinion 52 is drivingly engaging the rack teeth 62, the corner D follows a lateral path portion 65 until a cam surface 66 engages a lug 67. This cam surface 66 is arranged to prevent excessive forward motion of the foot 25 so that this foot does not engage other apparatus within the camera housing when it is being rapidly driven toward the front of the camera. Also, this reaction assures a suitable clearance between the teeth 54 and the pinion 52. As the corner D reaches position E, the lug 57 has cleared the arm 40 so that the rack 46 starts its leftward motion. As a result, the cam surfaces 68, 69, and 70, respectively, follow the lug 67, with the surface 69 being arranged to lock the rack 46 by a combination of forces, including the engagement developed between the arm 40 and the lug 45. The rack 46 is thus prevented from completing its cycle until the sensing pawl 38 has moved into one of the film apertures 39, whereupon there is provided sufficient clearance to allow the rack to continue its leftward motion. Fnally, the foot 25 comes to rest against the trigger trip 24, and the film 17 and trigger arrangement 21 are ready to accomplish a next exposure. It should be noted that if the force of the gears, etc., is insufficient to complete this cycle, operation of the trigger arrangement 21 will not release the foot 25 to again operate the shutter 27. Because of the interdependence of the various operations set forth above, double exposures are prevented.

Referring now to FIG. 3, we have illustrated a take-up spool 72 having partially wound thereon a length of the film strip 17. This spool 72 is driven by a spool driver (FIG. 6) during the rotation of the ratchet tooth gear 30, which is coupled thereto. The spool is driven only so long as neither the back-up pawl 31 nor the metering pawl 36 engages a ratchet tooth to prevent its rotation. Also shown in FIGS. 2 and 3 are a kick-out lug 78 and another lug 80, which engage the back-up pawl 31 and the metering pawl 36 when the latch tab 18 is moved to open the back of the camera housing to allow changing of take-up spools 72.

Thus, we have disclosed a camera 10 having a winding knob 13 which may be mechanically driven to energize the take-up spool 72 with the rotation of the take-up spool being controlled by the position of the sensing pawl 38 as well as the position of the trigger arrangement 21. However, the means for energizing the ratchet tooth gear 30 is shown more clearly in FIG. 6.

Referring now to FIG. 5, we have shown a portion of the camera housing 10, the winding knob 13, the latch tab 18, the ratchet tooth gear 30, the back-up pawl 31, the gear plate 33, the gears 50 and 51, the pinion 52, and the above-mentioned spool driver 74. The latch tab 18, in addition to releasing the back portion of the camera 10, raises an annular sleeve 76 which raises the spool driver 74 sufficiently to release the drive teeth 77 from the spool 72. Also, the kick-out lug 78 engages a surface 79 (FIG. 3) of the metering pawl 36 to rotate this lever and move the metering pawl 36 out of engagement with the ratchet tooth gear 30. Another lug 80 engages the back-up pawl 31 to lock the ratchet tooth gear 30 and prevent loss of any energy stored in a main power spring 82 of the system.

The mainspring 82 is coupled by a drive shaft 83 through a bushing 84 in the gear plate 33 to a spool driver spring 85 having a central slot 86. Thus, the drive shaft 83 rotates the spring 85 to force the drive fingers 87 to engage the driver surfaces 88. At the same time, the spool driver spring 85 allows limited vertical motion of the spool driver 74 during opening and closing of the camera as discussed above. The drive shaft 83 is coupled to the mainspring 82 by a tapered lug 89, which allows overrunning of the mainspring without damage to it. The drive shaft 83 has secured thereon a take-up gear 90, which drives the gear cluster including the pinion 52 through the gear 91. Also in this gear cluster is the large gear 51, which is drivingly coupled to the gear 50. As is obvious from the drawings, the ratchet tooth gear 30 rotates at an angular velocity substantially greater than that of the drive shaft 83.

In addition to the ratchet tooth gear 30 being instrumental in the starting and stopping of the motion of the film 17, it also functions as a portion of a speed control arrangement including a pair of governor shoes 94, which are rotated by blades 96 in accordance with rotation of the ratchet tooth gear 30. During rotation, the governor shoes 94 are driven radially to engage the inner surface of a nonrotatable governor cup 97. Since the timing duration, as a function of a length of the apertures 39 and the acceleration potential of the metering lever 41, dictates the maximum speed at which the film 17 may be driven with reasonable assurance that the sensing pawl 38 may drop into each of the apertures 39, the drive speed of the entire mechanism is quite critical. Moreover, in view of the fact that the position of any particular ratchet tooth is unpredictable relative to the location of various apertures 39 because of the convolution growth of the film on the spool 72 during the winding operation, there is no assurance that the metering pawl 36 will not move toward the ratchet tooth gear 30 at an instant that will cause it to bounce from the tip of a ratchet tooth prior to finding a locking engagement position. For this reason also, the speed of the governor mechanism must be limited to a reasonable value.

Because of the nature of this problem, the weight of the governor shoes 94 should be reasonably large compared to the angular torque applied to the shoes and the coefficient of friction developed between the shoes 94 and the inner surface of the governor cup 97 should be precisely predictable and substantially unvariable. Much to our surprise, many materials which appear to have suitable properties for a governor cup of this type fail at lower temperatures. Thus, the friction seems to fall off sharply at some reduced temperature, probably a phase change temperature of the material. When using brass governor shoes of about .060 inch thickness and a cup inner diameter of about .5 inch with the surface being composed of a cork chips and neoprene material, a governor action which is substantially insensitive to temperature changes in the region of 0° F. to 100° F. is attainable. Using a 12:1 gear ratio to drive the governor, it will absorb sufficient energy to regulate the speed of the ratchet tooth gear 30 within reasonable limits for a particular mainspring driving arrangement.

The mainspring housing includes a motor cup 100 having a planar or flat base and cylindrical walls. One end of the mainspring 82 is secured to the cup 100, with the other end of the mainspring being secured to the drive shaft 83 as discussed above. However, since the overall design of the camera housing 10 dictates positioning of the winding knob 13 and the required location of the spool 72 dictates location of the drive shaft 83, we have found it desirable to provide a drive shaft hub bushing 102 centered in the motor cup 100 and having an off-center journal aperture 103 therethrough. Thus, the drive shaft 83 is not centered in the motor cup 100. Although a manufacturer of watch spring drives suitable for use in this type of winding knob 13 doubted the feasibility of such a location of the drive shaft 83, we have found that non-centering does not materially damage the effectiveness or the efficiency of the mainspring 82.

Further support of the drive shaft is provided by the bushing 84 and the slot 86 in the spool drive spring 85. Moreover, additional support for the drive shaft 83 is provided by a locating finger 104 of a main spring retainer 105. Because the main spring retainer 105 is non-rotatably secured to the motor cup 100 by means of a slot and tab arrangement shown at 106, the end of the drive shaft 83 supported thereby follows a circular path under the locating finger 104. As a result, the lower surface of the locating finger 104 is flattened to provide equal support throughout all positions.

Also, because of the spacing between the locating finger 104 and the spring retainer 105, the mainspring 82 tends to creep through the slot defined. To eliminate this problem, we have provided a washer 107 which is journalled on and centered by the upper end of the drive shaft 83 and has a radius no greater than the minimum spacing between the off-center aperture 103 and the inner surface of the motor cup 100.

Energizing of the mainspring 82 is accomplished by rotating a winding knob shell 109 so that inner ratchet teeth 110 thereof engage a plurality of ratchet fingers 111 to rotate the spring retainer 105 and the motor cup 100 secured thereto. Loss of energy in the mainspring 82 is prevented by a ratchet plate 112, which is secured to the camera housing 10, and to the gear plate 33. Being thus secured, a plurality of flexible fingers 113 engage a plurality of ratchet finger slots 114 of the motor cup 100 to prevent rotation thereof, which would tend to unwind the mainspring 82. We have found that the ratchet plate 112 is most easily secured to the motor cup 100 by staking the hub bushing 102 thereto. In this arrangement, the securing of the ratchet plate 112 to the camera housing 10 secures the entire winding knob 13 including the spring drive motor and a cap 115.

While we have shown and described particular embodiments of the present invention, other modifications may occur to those skilled in this art. We intend, therefore, to have the appended claims cover all modifications which fall within the true spirit and scope of our invention.

We claim:

1. An automatic film winding arrangement for a camera comprising:

a spring drive motor having a drive shaft coupled to a take-up spool drive for winding a photographic film strip on a take-up spool;

a ratchet tooth gear drivably coupled to said drive shaft;

a metering lever having a metering pawl for selectively engaging said ratchet tooth gear to prevent rotation thereof;

a sensing pawl secured to said metering lever and positioned to engage apertures in the film strip, the relative position of said sensing pawl and said metering pawl being such that when said sensing pawl enters an aperture said metering pawl engages said ratchet tooth gear;

a metering spring biasing said metering lever to withdraw said sensing pawl from the region of the film apertures;

a rack selectivity drivable by gearing secured to said drive shaft;

a rack spring arranged to bias said rack in a generally lateral direction;

an arm secured to said metering lever engageable by said rack so that said rack spring drives said sensing pawl toward the region of the film apertures; and latch means for releasing said rack to allow it to respond to said rack spring bias with said rack having sufficient stroke to move laterally beyond said arm to release said metering lever arm so that said metering lever may react to said metering spring and withdraw said sensing pawl from a film aperture and said metering pawl from engagement with said ratchet tooth gear, said latch means including an arrangement for temporarily preventing rotation of said ratchet tooth gear.

2. An automatic film winding arrangement for a camera comprising:
   a spring drive motor having a drive shaft coupled to a take-up spool drive for winding a photographic film strip on a take-up spool;
   a ratchet tooth gear drivably coupled to said drive shaft;
   a pinion drivably coupled to said drive shaft;
   a metering lever having a metering pawl for engaging selectively said ratchet tooth gear to prevent rotation thereof;
   a sensing pawl secured to said metering lever for engaging apertures in the film strip;
   a metering spring biasing said metering lever to withdraw said sensing pawl from the region of the film apertures;
   a rack selectively drivable by said pinion;
   a rack spring arranged to bias said rack in a generally lateral direction;
   an arm secured to said metering lever engageable by said rack so that said rack spring drives said sensing pawl toward the film strip;
   trigger means movable from a stand-by position for releasing said rack to allow it to move in a lateral stroke in response to said rack spring bias with said rack having sufficient stroke to move clear of and release said metering lever arm so that said metering lever may react to said metering spring and withdraw said sensing pawl from a film aperture and said metering pawl from engagement with said ratchet tooth gear;
   means driven by said trigger means for temporarily preventing rotation of said ratchet tooth gear, whereby release of said trigger means will allow said means to return to stand-by and free said ratchet tooth gear;
   guide means for said rack co-operating with said rack spring to develop engagement between said rack and said pinion, whereby said rack is driven along a return stroke different from said lateral stroke so that said rack does not engage said arm to drive said sensing pawl toward the film strip;
   lateral drive means for coupling said rack to said pinion only after said return stroke is completed, whereby said rack is again positioned to drive said arm toward the film; and
   indicator means associated with the position of the film for allowing said sensing pawl to move sufficiently so that said rack may return to its stand-by position while maintaining engagement with said arm.

3. An automatic film winding arrangement for a camera having a film take-up spool, comprising:
   a spring drive motor;
   a ratchet tooth gear drivably coupled to said motor;
   a metering lever having a sensing pawl for detecting preselected locations of a photographic film strip, and having a metering pawl for selectively preventing the rotation of said gear;
   a rack movable from a stand-by position;
   biasing means for biasing said rack in a direction so the release of said rack from the stand-by position will open a shutter of the camera in moving to a second position, said rack when in the stand-by position coupling said biasing means to said lever to bias said sensing pawl against the film strip;
   a pinion drivably coupled to said motor for retracting said rack from said second position; and
   trigger means for releasing the rack to open the shutter for exposing a frame of the film and being arranged to temporarily prevent operation of said motor whereby release of said triggering means allows said pinion to retract said rack, the engagement between said rack and said lever being such that said rack cannot return to stand-by position until said lever sensing pawl senses one of the preselected locations of the film strip.

4. An automatic film winding arrangement as defined in claim 3 in which said spring drive motor is arranged to drive a film take-up spool and includes:
   a mainspring motor cup having a central axis;
   a mainspring having one end secured within said motor cup;
   a drive shaft drivable by said mainspring and coaxial with the take-up spool with its axis off-center relative to that of said motor cup; and
   a bushing coaxial with said motor cup and defining therein an off-center journal aperture for said drive shaft which aperture is coaxial with the take-up spool and thereby radially spaced from the axis of said motor cup.

5. An automatic film winding arrangement as defined in claim 3 in which said ratchet tooth gear defines a speed governing arrangement cavity including:
   a pair of depending drive blades secured to the said ratchet tooth gear;
   a pair of governor shoes driveable by said blades; and
   an annular nonrotatable governor cup arranged to define the maximum radial motion of said shoes with the inner surface thereof being a high coefficient of friction material when engaged by the said shoes in rotary motion.

6. An automatic film winding arrangement for a camera including a spring drive motor having a drive shaft arranged to be coupled to a tape-up spool for winding a photographic film strip thereon, comprising:
   take-up spool driving means drivably coupled to the drive shaft;
   gear means drivably coupled to the drive shaft;
   a metering lever having a metering pawl for interlocking said gear means selectively to prevent rotation of said driving means;
   a sensing pawl secured to said metering lever and positioned to engage spaced-apart apertures in the film strip as it moves to said take-up spool;
   a rack normally in a stand-by position and selectively drivable by said gear means from a second position to the stand-by position;
   a rack spring arranged to bias said rack toward the second position;
   an arm secured to said metering lever engageable by said rack so that said rack spring biases said sensing pawl toward the region of the film apertures when in the stand-by position but not in the second position; and
   means for releasing said rack to allow it to respond to said rack spring bias and move to the second position so that said metering lever may withdraw said sensing pawl from the film and said metering pawl from an interlock position.

7. An automatic film winding arrangement for a camera including a spring drive motor having a drive shaft arranged to be coupled to a take-up spool for winding a photographic film strip thereon comprising:
   a metering lever;
   a sensing pawl secured to said metering lever and positioned to engage sequentially apertures in the film strip as it moves toward the take-up spool;
   a rack normally in a stand-by position;
   a rack spring arranged to bias said rack toward a second position; and
   an arm secured to said metering lever engageable by said rack so that said rack spring also biases said sensing pawl toward the region of the film apertures when in the stand-by position but not in the second position.

8. An automatic film winding arrangement for a camera having a spring drive motor and comprising:
   a metering lever having a sensing pawl for detecting preselected locations of a photographic film strip;
   a lever spring biasing said lever to withdraw said sensing pawl from the film strip;
   a rack movable from a stand-by position; and
   a rack spring biasing said rack when in the stand-by position in a direction so the release of said rack from stand-by position will open a shutter of the camera, said rack being positoned in the stand-by position to couple said rack spring to said metering lever to override said lever spring and bias said sensing pawl against the film strip.

9. An automatic film winding arrangement for a camera including a spring drive motor having a drive shaft arranged to be coupled to a take-up spool for winding a photographic film strip thereon, comprising:
   a pinion drivably coupled to the drive shaft;
   a metering lever having a metering pawl drivable selectively to move to an interlock position to prevent rotation of said pinion;
   a sensing pawl secured to said metering lever and drivable to sequentially engage spaced-apart apertures in the film strip;
   a rack normally in a stand-by position and selectively drivably coupled to said pinion from a second position to a third position;
   a rack spring arranged to bias said rack toward the second position;
   An arm secured to said metering lever engageable by said rack so that said rack spring biases said sensing pawl toward the region of the film strip when in the stand-by position but not in the second or the third position;
   trigger means depressable to release said rack to allow it to respond to said rack spring bias and move to the second position so that said metering lever may withdraw said sensing pawl from the film and said metering pawl from said interlock position;
   interlock means associated with said trigger means to prevent movement of said pinion during depression thereof, whereby release of said trigger means releases said interlock to allow driving of said pinion; and
   guide means associated with said rack, said rack spring and said pinion to maintain a driving connection of said rack by said pinion from said second position to said third position.

10. An automatic film winding arangement for a camera including a spring drive motor having a drive shaft arranged to be coupled to a take-up spool for winding a photographic film strip thereon, comprising:
    a pinion drivably coupled to the drive shaft;
    a metering lever having a metering pawl drivable selectively to move to an interlock position to prevent rotation of said pinion;
    a sensing pawl secured to said metering lever and drivable to sequentially engage spaced-apart apertures in the film strip;
    a rack normally in a stand-by position and selectively drivably coupled to said pinion from a second position to a third position;
    a rack spring arranged to bias said rack toward the second position;
    an arm secured to said metering lever engageable on one side thereof by a forward portion of said rack so that said rack spring biases said sensing pawl toward the region of the film strip when in the stand-by position but not in the second or the third position;
    trigger means depressable to release said rack to allow it to respond to said rack spring bias and move to the second position so that said metering lever may withdraw said sensing pawl from the film and said metering pawl from said interlock position;
    interlock means arranged to prevent movement of said pinion during depression of said trigger means, whereby release of said trigger means releases said interlock to allow driving of said pinion;
    guide means associated with said rack, said rack spring and said pinion to maintain a driving connection of said rack by said pinion from said second position to said third position;
    lateral rack teeth arranged to co-operate with said pinion to rotate said rack, said rack engaging said arm during rotation thereof so that said lateral teeth remain in contact therewith for a predetermined distance with such distance being such that the forward portion moves to said one side of said arm whereby rack again responds to said rack spring and the driving coupling with said pinion is disconnected; and
    a lug positioned relative to said rack to provide a restricting lateral force on said rack which prevents return thereof to said stand-by position until said sensing pawl again engages one of the spaced-apart apertures.

11. An automatic film winding arrangement for a camera including a spring drive motor saving a drive shaft arranged to be coupled to a take-up spool for winding a photographic film strip thereon, comprising:
    a metering lever;
    a sensing pawl secured to said metering lever and drivable to sequentially engage spaced-apart apertures in the film strip;
    a rack normally in a stand-by position and selectively drivable from a second position to a third position;
    a rack spring coupled to bias said rack toward the second position;
    an arm secured to said metering lever engageable on one side thereof by a forward portion of said rack so that said rack spring biases said sensing pawl toward the region of the film strip when in the stand-by position but not in the second or the third position;
    gear means associated with the spring drive motor for driving said rack from the second position to the third position;
    lateral rack drive means drivable by said gear means to rotate said rack from the third position, said rack engaging said arm during rotation thereof until the forward portion moves to said one side of said arm whereby said rack again responds to said rack spring to bias said sensing pawl toward the film strip; and
    a lug positioned relative to said rack to provide a restricting lateral force on said rack which prevents return thereof to said stand-by position until said sensing pawl again engages one of the spaced-apart apertures.

12. An automatic film winding arrangement for a camera including a spring drive motor having a drive shaft arranged to be coupled to a take-up spool for winding a photographic film strip thereon, comprising:
    take-up spool driving means drivably coupled to the drive shaft;
    gear means drivably coupled to the drive shaft;
    a metering lever having a metering pawl for interlocking said gear means selectively to prevent rotation of said driving means;
    a sensing pawl secured to said metering lever and drivable to engage spaced-apart apertures in the film strip only during interlocking by the metering pawl;
    a rack normally in a stand-by position; and
    a rack spring arranged to bias said rack, a portion of said rack directly biased by said rack spring engaging said metering level so that said rack spring biases said sensing pawl toward the region of the film apertures when said rack is in the stand-by position.

13. An automatic film winding arrangement for a camera having a spring drive motor comprising:
a drive shaft drivable by the spring drive motor;
a take-up spool drivable by said shaft to wind thereon a photographic film strip;
a spool driver spring for coupling said drive shaft to said take-up spool;
a latch tab for opening means to provide access to said take-up spool;
gearing drivably coupled to said drive shaft;
a back-up pawl positionable to interlock said gearing for preventing loss of energy from the spring drive motor;
a hold lug drivable by said latch tab to position said back-up pawl in an interlock position only when the said latch tab is moved to the position facilitating access to said take-up spool; and
means derivable by said latch tab for compressing said spool driver spring to disconnect said take-up spool therefrom.

14. An automatic film winding arrangement for a camera including a spring drive motor having a drive shaft arranged to be coupled to a take-up spool for winding a photographic film strip thereon, comprising:
a metering lever;
a sensing pawl secured to said metering lever and drivable to sense selected locations of the film strip;
a rack normally in a stand-by position; and
a rack spring arranged to bias said rack so that a portion of said rack which is directly biased by said rack spring engages said metering lever to couple said rack spring to said sensing pawl for biasing said sensing pawl toward the region of the film strip only when said rack is in the stand-by position.

15. An automatic film winding arrangement for a camera including a spring drive motor having a drive shaft arranged to be coupled to a take-up spool for winding a photographic film strip thereon, comprising:
a metering lever;
a sensing pawl secured to said metering lever and drivable to sequentially engage spaced-apart apertures in the film strip;
a rack normally in a stand-by position;
a rack spring coupled to bias said rack so that a forward portion of said rack which is directly biased to said rack spring engaging said metering lever to couple said rack spring to drive said sensing pawl toward the film strip when said rack is in the stand-by position;
means for releasing said rack to allow it to move to a second position whereby said metering lever is freed;
means associated with the spring drive motor for driving said rack from the second position to a third position;
lateral rack drive means drivable to rotate said rack from the third position, said rack engaging said metering lever during rotation thereof until the forward portion moves to a position whereby said rack again responds to said rack spring to bias said sensing pawl toward the film strip; and
a lug positioned relative to said rack to provide a restricting lateral force on said rack which prevents return thereof to said stand-by position until said sensing pawl again engages one of the spaced-apart apertures.

16. An automatic film winding arrangement for a camera having a spring drive motor comprising:
a drive shaft drivable by the spring drive motor;
a take-up spool drivable to wind thereon a photographic film strip;
a spool driver spring coupling said drive shaft to said take-up spool;
a metering lever;
a sensing pawl secured to said metering lever and drivable to sense selected locations of the film strip;
a rack;
a rack spring coupled by said rack to bias said sensing pawl toward the film;
a latch tab for opening means to provide access to said take-up spool;
gearing coupled to said drive shaft;
a back-up pawl positionable to interlock said gearing for preventing loss of energy from the spring drive motor;
a hold lug drivable by said latch tab to position said back-up pawl in an interlock position only when the said latch tab is moved to the position facilitating access to said take-up spool;
means drivable by said latch tab for compressing said spool driver spring to disconnect said take-up spool therefrom; and
a lug drivable by said latch tab to withdraw said sensing pawl from the film strip during access to the take-up spool.

17. An automatic film winding arrangement for a camera including a spring drive motor having a drive shaft arranged to be coupled to a take-up spool for winding a photographic film strip thereon, comprising:
a metering lever;
a sensing pawl secured to said metering lever and drivable to sense selected locations of the film strip;
a rack normally in a stand-by position;
a rack spring coupled to bias said rack so that a portion of said rack which is directly biased by said rack spring engages said metering lever to bias said sensing pawl toward the region of the film strip only when said rack is in the stand-by position;
a latch tab for opening a portion of the camera to provide access to the take-up spool; and
a lug drivable by said latch tab to withdraw said sensing pawl from the film strip during access conditions.

18. An automatic film winding arrangement for a camera having a spring drive motor and comprising:
a metering lever having a sensing pawl for detecting pre-selected locations of a photographic film strip;
interlock means associated with said sensing pawl for preventing driving of the film when such locations are sensed;
a lever spring biasing said metering lever to withdraw said sensing pawl from the film strip;
a rack movable from a stand-by position; and
a rack spring biasing said rack in a direction so the release of said rack from stand-by position will open a shutter of the camera, said rack being positioned in the stand-by position to couple said rack spring to override said lever spring and bias said sensing pawl against the film strip, whereby only when said rack is in the stand-by position is said interlock means effective.

19. An automatic film winding arrangement for a camera having a film take-up spool, comprising:
a metering pawl for selectively preventing the rotation of the take-up spool;
a sensing pawl on said metering pawl;
a rack movable from a stand-by position to open a shutter of a camera; and
a rack spring biased in a direction so the release of said rack will open the shutter in moving to a second position, said rack in the stand-by position coupling said rack spring to said sensing pawl for causing said sensing pawl to engage the film strip.

20. An automatic film winding arrangement for a camera including a spring drive motor having a drive shaft arranged to be coupled to a take-up spool for winding a photographic film strip thereon, comprising:
- a metering lever;
- a sensing pawl secured to said metering lever and drivable to engage sequentially apertures in the film strip;
- a soft spring biasing said metering lever to withdraw said sensing pawl from the film;
- another spring selectively coupled to override said soft spring and bias said sensing pawl toward the film; and
- means for disconnecting said another spring from said sensing pawl during the period between operation of a shutter of the camera and initiation of winding the film on the take-up spool.

References Cited by the Examiner

UNITED STATES PATENTS

| | | | |
|---|---|---|---|
| 574,209 | 12/1896 | McFadden | 188—185 |
| 1,274,223 | 7/1918 | Weis | 95—31 |
| 1,367,268 | 2/1921 | Kessler | 95—31 |
| 1,452,413 | 4/1923 | Calabrese | 95—31 |
| 1,501,677 | 7/1924 | McMahon | 95—31 |
| 1,997,332 | 4/1935 | Green | 95—31 |
| 2,275,791 | 3/1942 | Mihalyi | 95—31 |
| 2,622,700 | 12/1952 | Geyer | 185—37 |
| 2,728,281 | 12/1955 | Mihalyi | 95—31 |
| 2,742,983 | 4/1956 | Baxter | 188—185 |
| 2,844,217 | 7/1958 | Klosner | 185—37 |

EVON C. BLUNK, *Primary Examiner.*